(12) United States Patent
Steele (10) Patent No.: US 6,884,330 B2
(45) Date of Patent: Apr. 26, 2005

(54) COUNTER PLATE ELECTRODE WITH SELF ADJUSTING Z-AXIS

(75) Inventor: Mark G. Steele, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 392 days.

(21) Appl. No.: 09/999,879

(22) Filed: Oct. 24, 2001

(65) Prior Publication Data

US 2002/0134683 A1 Sep. 26, 2002

Related U.S. Application Data

(60) Provisional application No. 60/274,387, filed on Mar. 9, 2001.

(51) Int. Cl.[7] .............................. C25F 7/00; C25D 17/10
(52) U.S. Cl. .............................. 204/224 M; 204/224 R; 204/288.1
(58) Field of Search .............................. 204/198, 224 R, 204/224 M, 242, 288.1; 384/100, 123; 205/649, 652

(56) References Cited

U.S. PATENT DOCUMENTS

| | | | | |
|---|---|---|---|---|
| 3,909,388 A | * | 9/1975 | Faust et al. ............. | 204/224 M |
| 4,486,279 A | * | 12/1984 | Fromson et al. ............. | 205/653 |
| 4,941,955 A | * | 7/1990 | Schuster ..................... | 205/652 |
| 5,758,421 A | | 6/1998 | Asada | |
| 5,878,495 A | | 3/1999 | Martens et al. | |
| 5,904,831 A | * | 5/1999 | Altena et al. ............... | 205/652 |
| 5,914,832 A | | 6/1999 | Teshima | |
| 6,267,869 B1 | * | 7/2001 | MacLeod et al. ........... | 205/668 |
| 6,358,394 B1 | * | 3/2002 | Cochran ..................... | 205/640 |
| 6,532,662 B1 | * | 3/2003 | Kobayashi et al. ....... | 29/898.02 |
| 6,638,414 B1 | * | 10/2003 | MacLeod et al. ........... | 205/668 |
| 2001/0050235 A1 | * | 12/2001 | MacLeod et al. ........... | 205/640 |
| 2003/0217931 A1 | * | 11/2003 | Usui et al. .................. | 205/652 |

FOREIGN PATENT DOCUMENTS

JP         63295122 A   * 12/1988   ............ B23H/5/00

* cited by examiner

*Primary Examiner*—Nam Nguyen
*Assistant Examiner*—Brian L. Mutschler
(74) *Attorney, Agent, or Firm*—Raghunath S. Minisandram; Jesus Del Castillo (57) ABSTRACT

The present invention relates to a method and apparatus for properly and consistently spacing an electrode from a workpiece while electrochemically etching (ECM) grooves to a precise depth in a surface of the workpiece to form a fluid dynamic bearing. The electrode is especially designed for imparting a grooved pattern to a flat surface, the electrode comprising a surface carrying the pattern to be formed on the flat surface, and a central rod extending a short distance above the electrode surface. The central rod precisely sets the gap between the electrode and the flat surface. The electrode is adapted to be electrically connected to a power supply so that the electrode serves as the cathode, and the flat work piece serves as the anode in an ECM system.

20 Claims, 7 Drawing Sheets

COUNTER PLATE ELECTRODE WITH SELF ADJUSTING Z-AXIS

CROSS-REFERENCE TO RELATED APPLICATIONS

This application claims benefit of United States Provisional Application No. 60/274,387, entitled COUNTER PLATE ELECTRODE WITH SELF ADJUSTING Z-AXIS, filed Mar. 9, 2001 by Mark G. Steele, which is hereby incorporated by reference in its entirety.

FIELD OF THE INVENTION

This invention pertains generally to the field of fluid dynamic bearings, and more particularly to etching grooves in a counter plate of a fluid dynamic bearing.

BACKGROUND OF THE INVENTION

Disc drives, including magnetic disc drives, optical disc drives and magneto-optical disc drives, are widely used for storing information. A typical disc drive has one or more discs or platters which are affixed to a spindle and rotated at high speed past a read/write head suspended above the discs on an actuator arm. The spindle is turned by a spindle drive motor. The motor generally includes a shaft having a thrust plate on one end, and a rotating hub having a sleeve and a recess into which the shaft with the thrust plate is inserted. Magnets on the hub interact with a stator to cause rotation of the hub relative to the shaft.

In the past, conventional spindle motors frequently used conventional ball bearings between the hub and the shaft and the thrust plate. However, over the years the demand for increased storage capacity and smaller disc drives has led to the read/write head being placed increasingly close to the disc. Currently, read/write heads are often suspended no more than a few millionths of an inch above the disc. This proximity requires that the disc rotate substantially in a single plane. Even a slight wobble or run-out in disc rotation can cause the disc to strike the read/write head, damaging the disc drive and resulting in loss of data. Because this rotational accuracy cannot be achieved using ball bearings, the latest generation of disc drives utilize a spindle motor having fluid dynamic bearings on the shaft and the thrust plate to support a hub and the disc for rotation.

In a fluid dynamic bearing, a lubricating fluid such as gas or a liquid or air provides a bearing surface between a fixed member and a rotating member of the disc drive. Dynamic pressure-generating grooves formed on a surface of the fixed member or the rotating member generate a localized area of high pressure or a dynamic cushion that enables the spindle to rotate with a high degree of accuracy. Typical lubricants include oil and ferromagnetic fluids. Fluid dynamic bearings spread the bearing interface over a large continuous surface area in comparison with a ball bearing assembly, which comprises a series of point interfaces. This is desirable because the increased bearing surface reduces wobble or run-out between the rotating and fixed members. Further, improved shock resistance and ruggedness is achieved with a fluid dynamic bearing. Also, the use of fluid in the interface area imparts damping effects to the bearing which helps to reduce non-repeat runout.

One generally known method for producing the dynamic pressure-generating grooves is described in U.S. Pat. No. 5,758,421, to Asada, (ASADA), hereby incorporated by reference. ASADA teaches a method of forming grooves by pressing and rolling a ball over the surface of a workpiece to form a groove therein. The diameter of the ball is typically about 1 mm, and it is made of a material such as carbide which is harder than that of the workpiece. This approach and the resulting fluid dynamic bearing, while a major improvement over spindle motors using a ball bearing, is not completely satisfactory. One problem with the above method is the displacement of material in the workpiece, resulting in ridges or spikes along the edges of the grooves. Removing these ridges, for example by polishing or deburring, is often a time consuming and therefore a costly process. Moreover, to avoid lowering yields, great care must be taken not to damage the surface of the workpiece.

A further problem with the above method is due to a recent trend in disc drives toward higher rotational speeds to reduce access time, that is the time it takes to read or write data to a particular point on the disc. Disc drives now commonly rotate at speeds in excess of 7,000 revolutions per minute. These higher speeds require the shaft and the hub to be made of harder material. Whereas, in the past one or more of the shaft, the sleeve or the hub, could be made of a softer material, for example brass or aluminum, now all of these components must frequently be made out of a harder metal such as, for example, steel, stainless steel or an alloy thereof. These metals are as hard or harder than the material of the ball. Thus, the above method simply will not work to manufacture fluid dynamic bearings for the latest generation of disc drives.

Another method for producing the grooves of a fluid dynamic bearing is described in U.S. Pat. No. 5,878,495, to Martens et al. (MARTENS), hereby incorporated by reference. MARTENS teach a method of forming dynamic pressure-generating grooves using an apparatus, such as a lathe, having a metal-removing tool and a fixture that moves the workpiece incrementally in the direction in which a pattern of grooves is to be formed. The metal-removing tool forms the grooves by carrying out a short chiseling movement each time the workpiece is moved. This approach, while an improvement over the earlier one in that it does not produce ridges that must be removed, is also not completely satisfactory. For one thing, this approach like that taught by ASADA is typically not suitable for use with harder metals, which in addition to being more difficult to machine are often brittle and can be damaged by the chiseling action. Moreover, because each groove or portion of a groove must be individually formed and the workpiece then moved, the process tends to be very time consuming and therefore costly. Furthermore, the equipment necessary for this approach is itself expensive and the metal-removing tool is subject to wear and requires frequent replacement.

A final method for producing the grooves involves a conventional etching process as described in U.S. Pat. No. 5,914,832, to Teshima (TESHIMA), hereby incorporated by reference. TESHIMA teaches a process in which the workpiece is covered with a patterned etch resistant coating prior to etching so that only the exposed portions of the workpiece are etched. While this approach avoids many of the problems of the previously described methods, namely the formation of ridges around the grooves and the inability to form grooves in hard metal, it creates other problems and therefore is also not wholly satisfactory. One problem is the time consumed in applying and patterning the etch resistant coat. This is particularly a problem where, as in TESHIMA, the resist coat must be baked to prior to patterning or etching. Another problem is that the coating must be removed after etching. This is frequently a difficult task, and one that if not done correctly can leave resist material on the workpiece surface resulting in the failure of the bearing and destruction of the disc drive. Yet another problem with this approach is that each of the steps of the process requires the extensive use of environmentally hazardous and often toxic chemicals including photo resists, developers, solvents and strong acids.

Accordingly, there is a need for an apparatus and method for forming grooves in a workpiece made of a hard metal to manufacture fluid dynamic bearings suitable for use in a disc drive. It is desirable that the apparatus and method that allows the grooves to formed quickly and cheaply. It is also desirable that the apparatus and method not require expensive equipment or the use of a metal-removing tool that must be frequently replaced. It is further desirable that the apparatus and method not use an etch resistant material during manufacture that could contaminate the workpiece leading to the failure of the bearing and destruction of the disc drive.

As the result of the above problems, electrochemical machining of grooves in a fluid dynamic bearing has been developed as described in the above-incorporated patent application. A broad description of ECM is as follows. ECM is a process of removing material metal without the use of mechanical or thermal energy. Basically, electrical energy is combined with a chemical to form a reaction of reverse electroplating. To carry out the method, direct current is passed between the work piece which serves as an anode and the electrode, which typically carries the pattern to be formed and serves as the cathode, the current being passed through a conductive electrolyte which is between the two surfaces. At the anode surface, electrons are removed by current flow, and the metallic bonds of the molecular structure at the surface are broken. These atoms go into solution, with the electrolyte as metal ions and form metallic hydroxides. These metallic hydroxide (MOH) molecules are carried away to be filtered out. However, this process raises the need to accurately and simultaneously place grooves on a surface across a gap between the electrode and the workpiece, which gaps must be very accurately set. This requires the use of a work holder which can accurately locate and constrain a workpiece within an electrochemical machining process environment (ECM). ECM is used to place grooves on the moving parts of a fluid dynamic bearing. The depth of these grooves has a typical tolerance of ±0.003 mm. Therefore the electrode/workpiece position error must be no greater than this.

In a very commonly used fluid dynamic bearing design, a flat circular plate referred to as a counter plate is used, and must have grooves precisely etched thereon. The invention resulted from the need to accurately locate the distance between a thrust surface type ECM electrode (which defines the groove pattern) and a counter plate (the circular plate used in fluid dynamic motors) within an electro-chemical machining process (ECM). ECM is used to plate grooves on the moving or stationary elements of a fluid dynamic motor. The depth of these grooves has a tolerance of ±0.002–0.003 mm. Therefore the electrode/workpiece maching gap error must be no greater than this. In order to keep the counter plate cost to a relative low, the thickness of the plate has a large size tolerance, typically ±0.025 mm. This shift in plate thickness can alter the machining gap to a point where groove depth consistency is practically unattainable within the specification limits. In addition to the accuracy, the gap adjusting mechanism should be without parts movable while the process is being executed (the salt dissolved in the electrolytes will crystallize and hinder its movement) and be easy to manufacture. The salt dissolved in the electrolyte will crystallize and hinder its movement.

The present invention provides a solution to these and other problems, and offers other advantages over the prior art.

SUMMARY OF THE INVENTION

The present invention relates to a method and apparatus for properly and consistently spacing an electrode from a workpiece while electrochemically etching grooves in a surface of the workpiece to form a fluid dynamic bearing.

Other features and advantages of this invention will be apparent to a person of skill in this field who studies the following detailed description of an embodiment of the invention given in conjunction with the associated drawings.

DETAILED DESCRIPTION OF THE INVENTION

Figure 1:
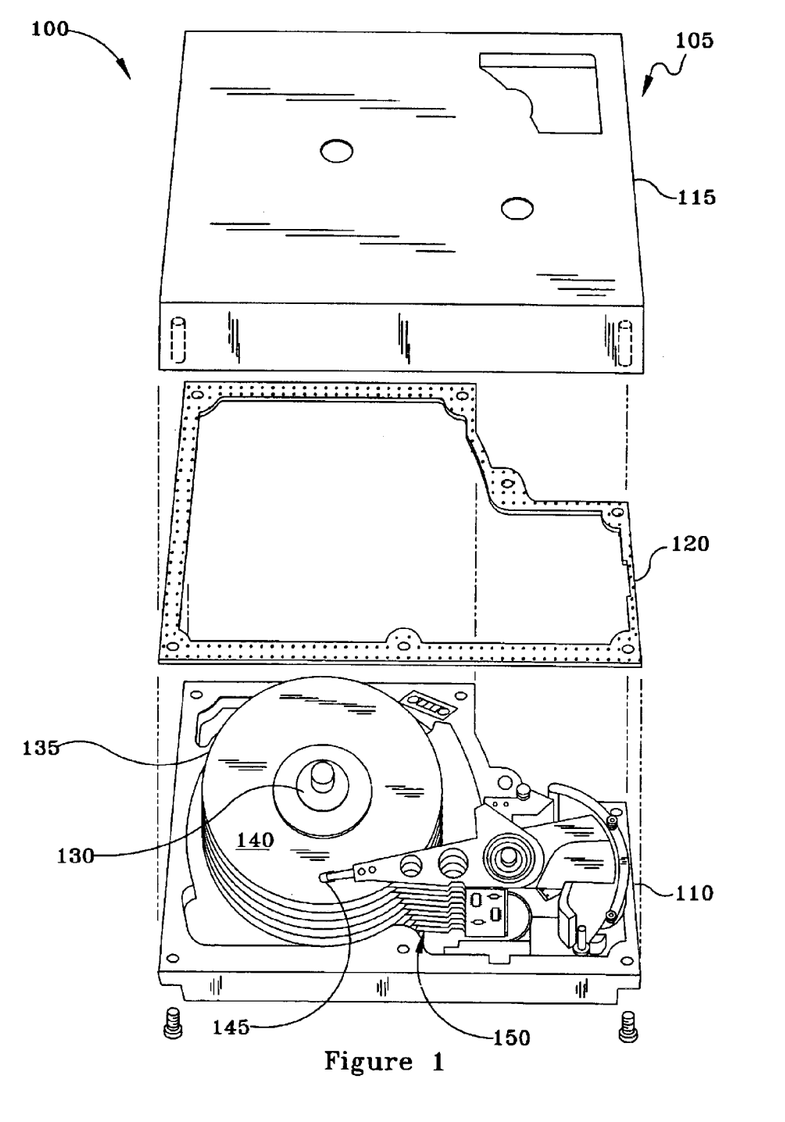
FIG. 1 illustrates a disc drive in which a motor incorporating the hydrodynamic bearing whose grooves are formed using the present invention is especially useful.

Other features and advantages of this invention will be apparent to a person of skill in this field who studies the following detailed description of an FIG. 1 is an exploded perspective view a magnetic disc drive for which a spindle motor having a fluid dynamic bearing manufactured by the method and apparatus of the present invention is particularly useful. Referring to FIG. 1, a disc drive 100 typically includes a housing 105 having a base 110 sealed to a cover 115 by a seal 120. The disc drive 100 has a spindle 130 to which are attached a number of discs 135 having surfaces 140 covered with a magnetic media (not shown) for magnetically storing information. A spindle motor (not shown in this figure) rotates the discs 135 past read/write heads 145 which are suspended above surfaces 140 of the discs by a suspension arm assembly 150. In operation, spindle motor rotates the discs 135 at high speed past the read/write heads 145 while the suspension arm assembly 150 moves and positions the read/write heads over one of a several radially spaced tracks (not shown). This allows the read/write heads 145 to read and write magnetically encoded information to the magnetic media on the surfaces 140 of the discs 135 at selected locations.

Figure 2A:
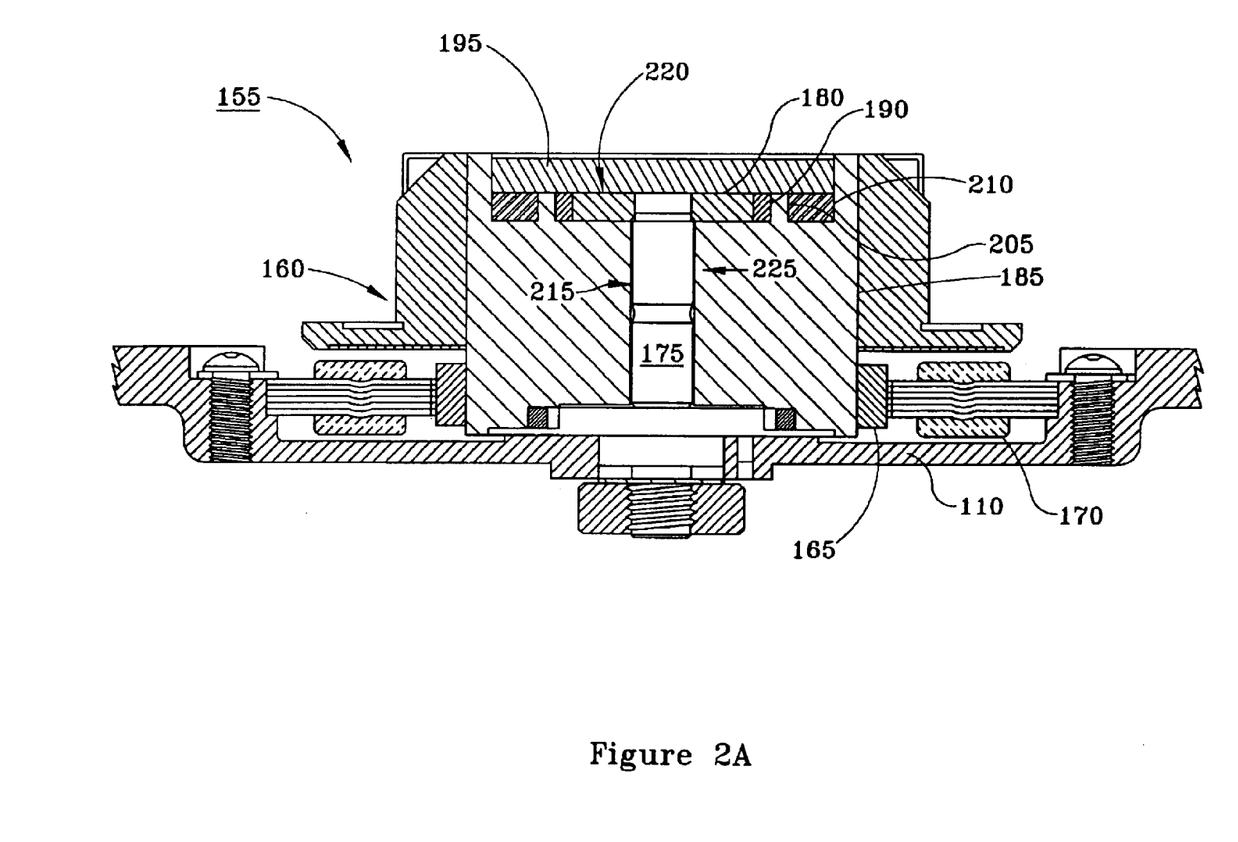
FIG. 2A is a vertical section of the spindle motor of FIG. 1.

FIG. 2A is a sectional side view of a spindle motor 155 of a type which is useful in disc drives 100. Typically the spindle motor 155 includes a rotatable hub 160 having one or more magnets 165 attached to a periphery thereof. The magnets 165 interact with a stator winding 170 attached to the base 110 to cause the hub 160 to rotate. The hub 160 is supported on a shaft 175 having a thrust plate 180 on an end. The thrust plate 180 can be an integral part of the shaft 175, or it can be a separate piece which is attached to the shaft, for example, by a press fit. The shaft 175 and the thrust plate 180 fit into a sleeve 185 and a thrust plate cavity 190 in the hub 160. A counter plate 195 is provided above the thrust plate 180 resting on an annular ring 205 that extends from the hub 160. An O-ring 210 seals the counter plate 195 to the hub 160.

A fluid, such as lubricating oil or a ferromagnetic fluid fills interfacial regions between the shaft 175 and the sleeve 185, and between the thrust plate 180 and the thrust plate cavity 190 and the counter plate 195. One or more of the thrust plate 180, the thrust plate cavity 190, the shaft 175, the sleeve 185, or the counter plate 195 have pressure generating grooves (not shown in this figure) formed in accordance with the present invention to create fluid dynamic bearings 220, 225. Preferably, grooves are formed in an outer surface 215 of the shaft 175 to facilitate inspection of the grooves. More preferably, the grooves in the outer surface 215 of the shaft 175 form one or more fluid dynamic journal bearings 225 having dynamic cushions that rotatably support the hub 160 in a radial direction.

Figure 2B:
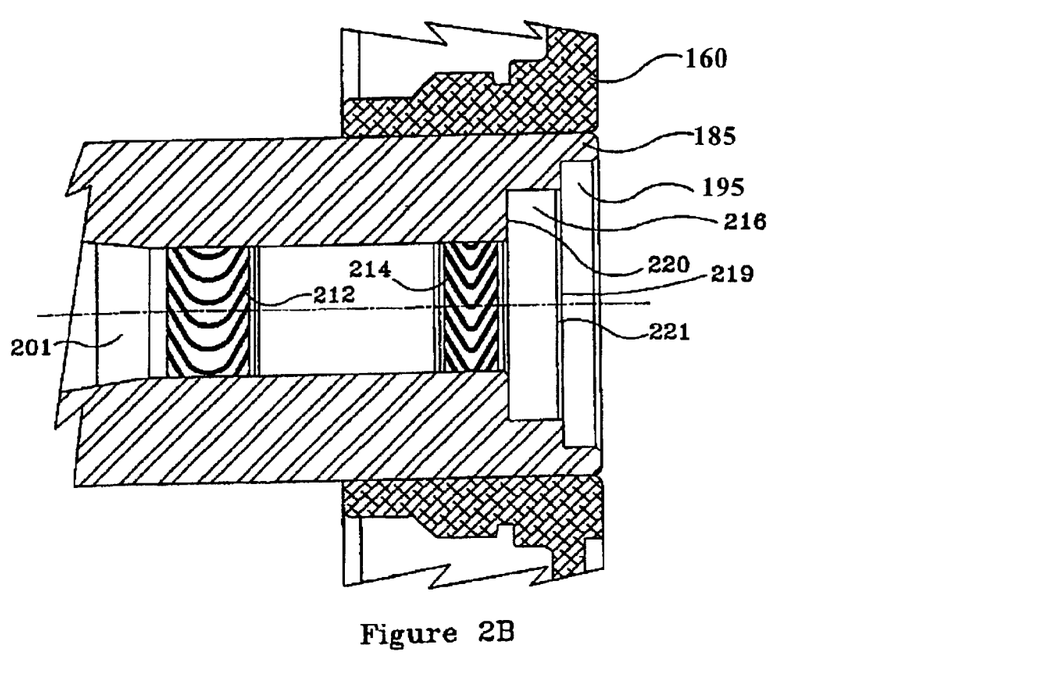
FIGS. 2B and 2C are vertical and horizontal sectional views of a portion of the motor, especially the shaft and thrust plate, illustrating the grooves which may be formed utilizing the present invention.
Figure 2C:
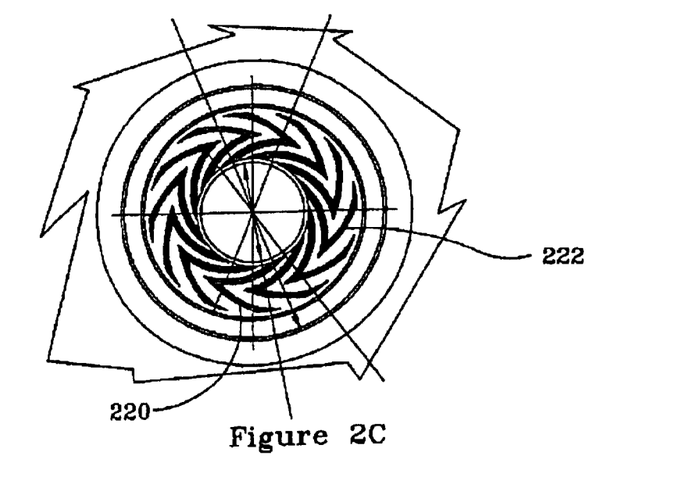

FIGS. 2B and 2C are a vertical sectional view and top plan view, respectively, of a hub and sleeve combination illustrating the grooves which establish the hydrodynamic bearings used to support the sleeve and hub for rotation relative to shaft 175. In accordance with design principles well known in this field, the sleeve 185 supports on its outer surface a hub 160 which in turn will support one or more discs (not shown) for rotation. The internal surface of the main bore of sleeve 185 includes a pair of sets of grooves 212, 214 which in cooperation with the surface of the shaft and the intervening fluid (not shown) will form the journal bearings which are used to support the hub 160 for rotation about the shaft 175.

Typically, such a design also includes a thrust plate supported on one end of the shaft (and shown 180 in FIG. 2A). A recess 216 is provided for the thrust plate 180; a second recess 218 is provided for the counter plate 195 which overlies the thrust plate in the assembled motor and is used to define the hydrodynamic bearing gap with the upper surface of the thrust plate. The lower surface 219 of the counter plate 195 faces an axially outer surface 221 of the thrust plate 180. Either the thrust plate 180 surface or the surface of the counter plate 195 also includes a set of grooves 222 (FIG. 2B) which in this case are in the shape of a succession of chevrons similar to the pattern shown in FIG. 20 and which cooperate with the outer surface 221 of the thrust plate 150 to create a pressure gradient which will support the thrust plate 180 and counter plate 195 for smooth relative rotation. This also prevents tilting of the hub 160 and sleeve 105 relative to the thrust plate 180 and the shaft 175 to which it is affixed so the hub 160 rotates with great stability relative to around the shaft 175.

It is clear that because of the very small tolerances between the shaft and the thrust plate it supports and the internal surfaces of the sleeve, that the sleeve must be held with great stability in a jig of some sort while the ECM process is carried out; any variation in the gap between the sleeve and the electrode would cause a variation in the depth, spacing and placement of the grooves. As noted above, the fixture must be capable of holding the circular workpiece so that the depth of grooves will have a typical tolerance of ±0.003 millimeters.

Figure 3:
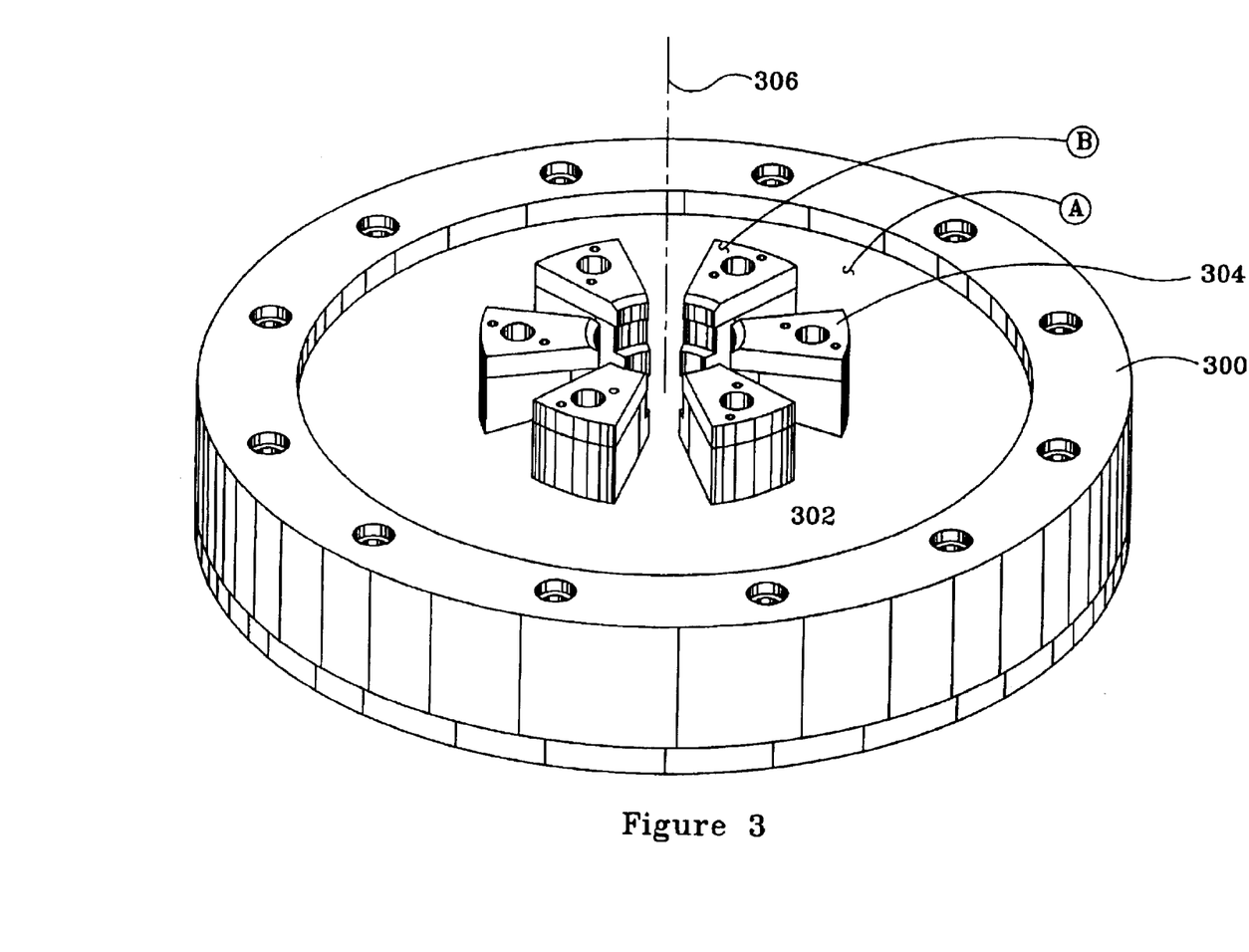
FIG. 3 is a perspective view of the diaphragm workholding device of the present invention.
Figure 4:
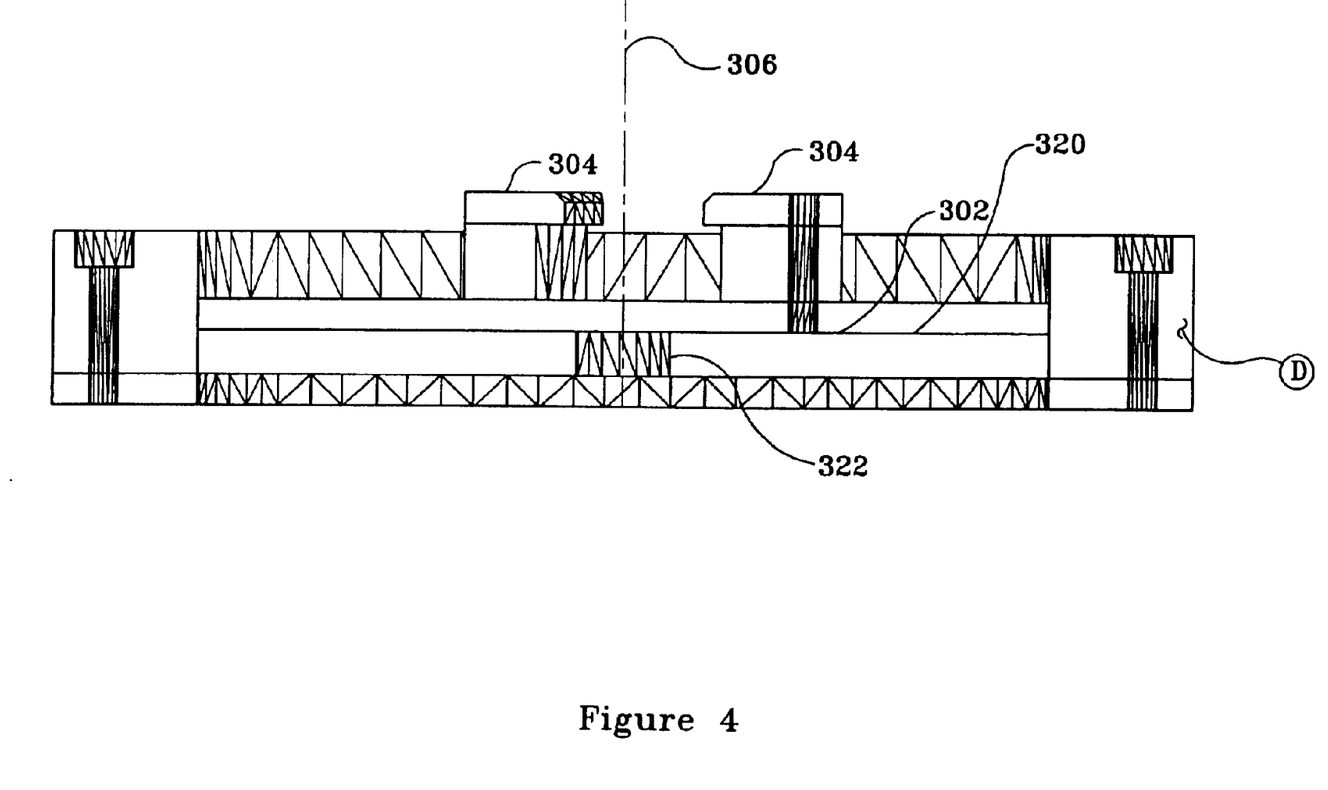
FIG. 4 is a cross section of the device of FIG. 3 shown with the diaphragm deflected.
Figure 5:
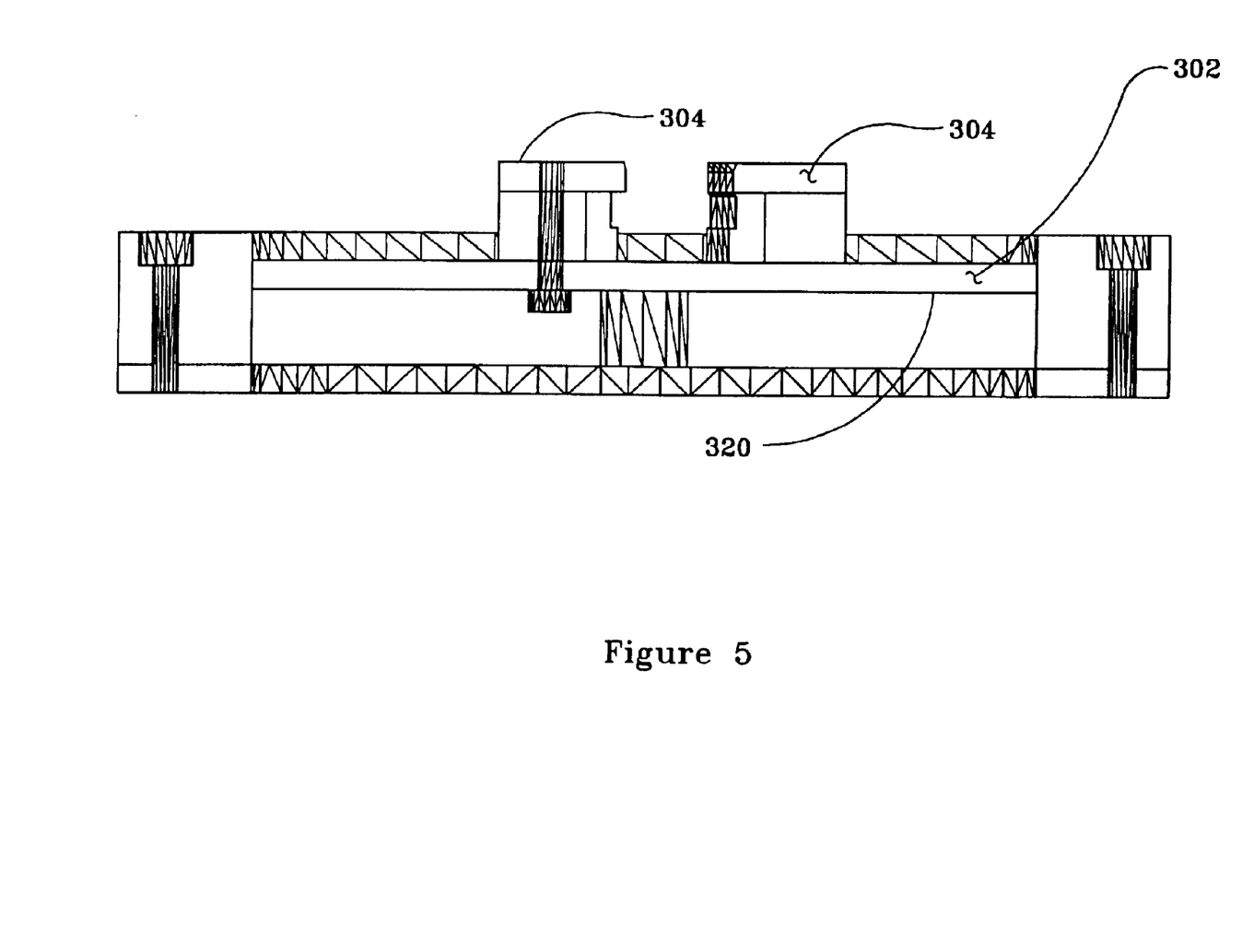
FIG. 5 is a view along the same section line as FIG. 4 showing the device in its relaxed state with the air pressure removed.

To achieve these goals, the work holder or fixture of FIGS. 3, 4 and 5 was designed, comprising a frame 300 which supports a diaphragm 302 having a plurality of jaw-like workholders 304 facing a common central axis 306. As shown more clearly in FIG. 4 which should be considered in conjunction with FIG. 3, as the diaphragm is deflected upward to assume a slightly more spheroidal shape, the jaws 304 are uniformly deflected away from the central axis 306 so that a circular or shaft based workpiece such as shown in FIGS. 2A and 2B can be inserted therein. As the air pressure is withdrawn, the deflected jaws 304 return to their original position as the diaphragm 302 flattens out, capturing the shaft or circular workpiece between the jaws. This operation is more readily apparent from the cross section of FIG. 4 which shows the diaphragm 302 relative to the backing plate 320. As air is injected through the air inlet 322, it can be seen that the diaphragm will deflect upwardly along the axis 306 with the upper part of each jaw leaning a little further away from the axis 306 than the lower part. This opening between the jaws 304 allows for the insertion of the shaft or circular workpiece. When the void between the diaphragm 302 and backing plate 320 is depressurized, the diaphragm will snap back to its original position, resting firmly against the backplate. The inner diameter of the generally circular work area defined by the jaws will be reduced, capturing the workpiece with a high level of precision accuracy. FIG. 5 shows these jaws returned to their original position.

So long as the air pressure does not exceed a predefined amount, the maximum bending moment of the diaphragm will not exceed the allowable, allowing substantial repeatability. Further, since the workpiece is consistently held in a repeatably reliable position, with its axial position being defined by the diaphragm, and its radial position accurately fixed by the jaws, an electrode can easily be inserted along the same axis 306. With the electrode in place, the electrolyte can be applied, and electrical current applied to the system, carrying out the ECM process to form the desired grooves on the workpiece.

The present invention is particularly concerned with providing a work piece holder to be used in conjunction forming a groove pattern such as is shown in FIG. 20 on the surface of counter plate 195 which is to face thrust plate 180 in order to support the counter plate and thrust plate for relative rotation, it is apparent that the same device could be used to support the thrust plate 180 if forming the grooves on that surface is desired.

The invention resulted from the need to accurately locate the distance between a thrust surface type ECM electrode and a counter plate (circular disk used in fluid dynamic motors) within an electro-chemical machining process (ECM). ECM is used to define grooves on the moving or stationary elements of a fluid dynamic motor. The dept of these grooves has a tolerance of ±0.002 to 0.003 mm. Therefore the electrode/workpiece machining gap error must be no greater than this. In order to keep the counterplate cost to a relative low, the thickness of the counterplate or other part has a large size tolerance, typically ±0.025 mm. This shift in plate thickness can alter the machining gap to a point where groove depth consistency is unattainable within the specification limits. In addition to the accuracy, the gap adjusting mechanism preferably should have minimum moving parts and be easy to manufacture. The salt dissolved in the electrolyte will crystallize and hinder movement of moving parts.

Figure 6A:
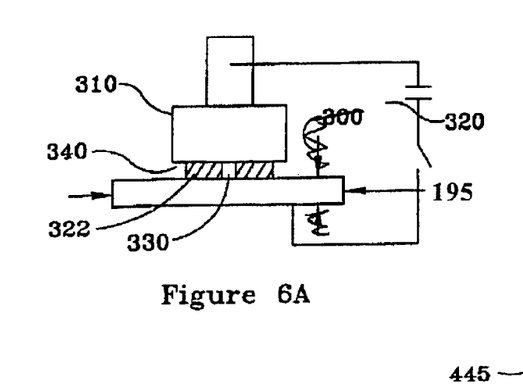
FIG. 6A is a schematic view of the function of the present invention.

Therefore, the present electrode, with a self-controlling machining gap has been designed. The electrode is designed to face the counter plate 195 across a gap 322 as shown schematically in FIG. 6A. The electrode 310 is made primarily of an electrically conductive material so that the pulsed direct current from the source 320 will pass between the anodic work piece, which in this case is the counter plate 195, and the cathodic electrode 310 through a conductive electrolyte generally shown at 320 which flows through the gap 322 between anode and cathode. At the anode surface of counter plate 195, electrons are removed by current flow and the metallic bonds of the molecular structure at the surface are broken. These atoms go into solution with the electrolyte as metal ions and form metallic hydroxides. The MOH molecules are carried away to be filtered out. For this reason, ECM may also be known as "anodic dissolution". A further element to be noted from FIG. 6A is that the surface 340 of electrode 310 comes the pattern to be formed on the surface of counterplate 195. This pattern is defined by raised lands of electrically conductive material, usually separated and surrounded by insulating material of equal height. Electrically conductive lands in a pattern as shown at FIG. 2C would produce a pattern on the surface of counter plate 195 which comprises the workplace of that design. While primarily made of a conductive material, the center of the electrode is an electrically inert material such as ceramic 330.

Figure 6B:
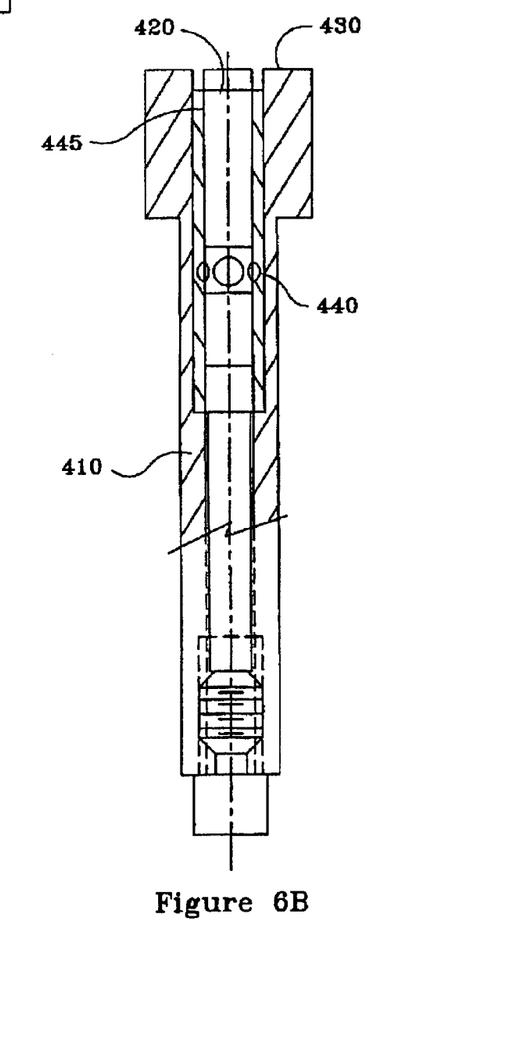
FIG. 6B is a vertical sectional view of a preferred embodiment.

The electrode 310 shown schematically in FIG. 6A is shown in greater detail in the cross-section view of FIG. 6B. As shown in this view, the electrode comprises an annular piece 410 of cylindrical cross-section, with a central rod 420, typically circular in cross-section, which extends (FIG. 6A 330) a short distance in FIG. 6A above the axially end surface 430 of the metallic electrode Thereby defining and establishing the gap spacing 300. An inlet 440 for electrolyte is provided axially spaced away from the end surface 430 of the electrode, and a gap 445 is defined between the outer surface of the central rod 420 and the inner surface of the conductive cylinder 410. The electrolyte flows through this gap to reach the axial outer end 430 of the electrode, and then flows radially away between the counter prate 195 which serves as the anode, and the cathodic electrode 430. This electrolyte as it flows away can then be captured and filtered or simply replaced by fresh electrolyte through the orifice 440.

As is apparent from both FIG. 6B and FIG. 6A, the electrically inert center rod 420 is extended a small and very precise set distance above the electrode surface 430. This sets the gap 350 which as explained above, is a key variable along with time and volume of current flow in establishing groove depth. That is, the center rod 420 establishes and maintains the machining gap in every ECM operation and thus the depth of the grooves formed in counter plate 195.

Other features and advantages of this invention may be apparent to a person of skill in this art who studies the present invention disclosure. The electrode of this invention can be used to define grooves of a desired depth on any metal surface; it is especially useful to form grooves on a counterplate or similar metallic price adapted to be held by the diaphragm of FIGS. 4 and 5. Therefore, the scope of the present invention is to be limited only by the following claims.

What is claimed is:

1. A device for accurately forming grooves of a precise pre-selected depth on a flat surface comprising an electrode for use in an ECM (electro chemical machining system), the electrode being designed for imparting a grooved pattern to a flat surface, the electrode comprising a surface carrying the pattern to be formed on the flat surface, and a center rod extending a short distance above the electrode surface, the center rod is the only spacer used for precisely setting a gap between the electrode and the flat surface.

2. A device as claimed in claim 1 wherein the electrode is adapted to be electrically connected to a power supply so that the electrode serves as the cathode, and the flat work piece serves as the anode in an ECM system.

3. A device as claimed in claim 1 wherein the surface of the electrode is annular in shape.

4. A device as claimed in claim 1 wherein a pattern to be formed on the flat surface is defined by raised lands of electrically conductive material formed on the surface of the electrode carrying the pattern.

5. A device as claimed in claim 4 wherein the raised lands of the electrically conductive material are separated by insulating material.

6. A device as claimed in claim 4 wherein the raised lands of the electrically conductive material are separated and surrounded by insulated material of equal height to the lands of the electrically conductive material.

7. A device as claimed in claim 4 wherein the center rod of the electrode comprises an electrically inert material.

8. A device as claimed in claim 7 wherein the center rod of the electrode comprises ceramic material.

9. A device for accurately forming grooves of a precise pre-selected depth on a flat surface comprising an electrode for use in an ECM (electro chemical machining system), the electrode being designed for imparting a grooved pattern to a flat surface, the electrode comprising a surface carrying the pattern to be formed on the flat surface, and a center rod extending a short distance above the electrode surface, the center rod precisely setting a gap between the electrode and the flat surface wherein the center rod is grooved threaded into the electrode so that the height of the central rod above the electrode surface can be adjusted.

10. A device for accurately forming grooves of a precise pre-selected depth on a flat surface comprising an electrode for use in an ECM (electro chemical maching system), the electrode being designed for imparting a grooved pattern to a flat surface, the electrode comprising a surface carrying the pattern to be formed on the flat surface, and a center rod extending a short distance above the electrode surface, the center rod precisely setting a gap between the electrode and the flat surface, wherein the center rod is movable axially within an outer section of the electrode.

11. A system for defining a groove pattern of a precise depth on a flat surface of a workpiece utilitizing electrochemical machining (ECM) comprising a first device for supporting the flat surface of the workpiece facing an electrode, and an electrode designed for imparting a grooved pattern to a flat surface, the electrode comprising an outer section ending in a surface carrying the pattern to be formed on the flat surface, and an electrically inert center rod extending a short distance above the electrode surface, the center rod is the only spacer used for precisely setting a first gap between the electrode and the flat surface.

12. A system as claimed in claim 11 comprising an inlet through said electrode outer section connected to a second gap between the center rod and the electrode outer section, said second gap extending axially to a surface of the electrode facing flat surface so that electrolyte can be supplied to the first gap defined between the electrode and the flat surface.

13. A system for defining a groove pattern of a precise depth on a flat surface of a workpiece utilitizing electrochemical machining (ECM) comprising a first device for supporting the flat surface of the workpiece facing an electrode, and an electrode designed for imparting a grooved pattern to a flat surface, the electrode comprising an outer section ending in a surface carrying the pattern to be formed on the flat surface, and an electrically inert center rod extending a short distance above the electrode surface, the center rod precisely setting a first gap between the electrode and the flat surface, wherein the center rod is movable axially within the outer section of the electrode.

14. A system as defined in claim 13 including a screw threaded into a center bore in the, electrode outer section and movable axially to move the center rod, thereby adjusting a second gap between the center rod and the electrode outer section.

15. A system as claimed in claim 14 wherein the screw is integrated with the center rod, threads being defined on the interior of the bore to position the rod.

16. A system as claimed in claim 15 wherein the center rod comprises an electrically inert material.

17. A system as claimed in claim 16 wherein a pattern to be formed on the flat surface is defined by raised lands of electrically conductive material formed on the surface of the electrode carrying the pattern.

18. A system as claimed in claim 17 wherein the raised lands of the electrically conductive material are separated and surrounded by insulated material of equal height to the lands of the electrically conductive material.

19. A system defining a groove pattern of a precise depth on a flat surface of a workpiece utilizing electrochemical machining (ECM) comprising a first device for supporting the flat surface of the workpiece facing an electrode, electrode facing the flat surface for imparting a grooved pattern to the flat surface, and an electrically inert center rod extending a short distance above a surface of the electrode, the center rod being grooved threaded into the electrode so that the height of the center rod above the electrode surface can be adjusted.

20. A system of claim 19 wherein the electrode comprises an outer section ending in a surface carrying the pattern to be formed on the flat surface of the workpiece, and the center rod is adapted to precisely set the gap between the electrode and the flat surface.

* * * * *